Aug. 21, 1962 H. S. MILLER 3,050,326
UTILITY CLAMP
Filed June 2, 1960 2 Sheets-Sheet 1
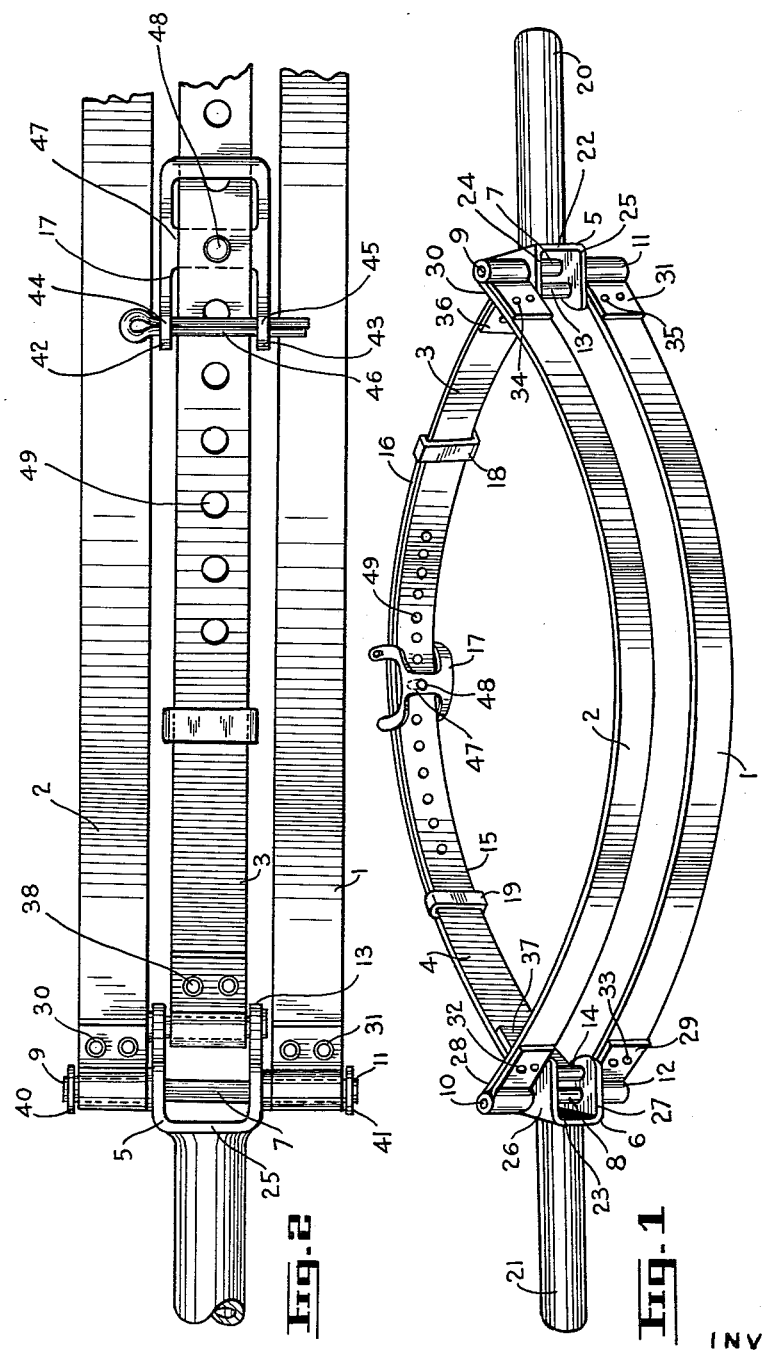
INVENTOR
Henry S. Miller
Ralph Burch
Attorney Aug. 21, 1962     H. S. MILLER     3,050,326
UTILITY CLAMP
Filed June 2, 1960                                  2 Sheets-Sheet 2
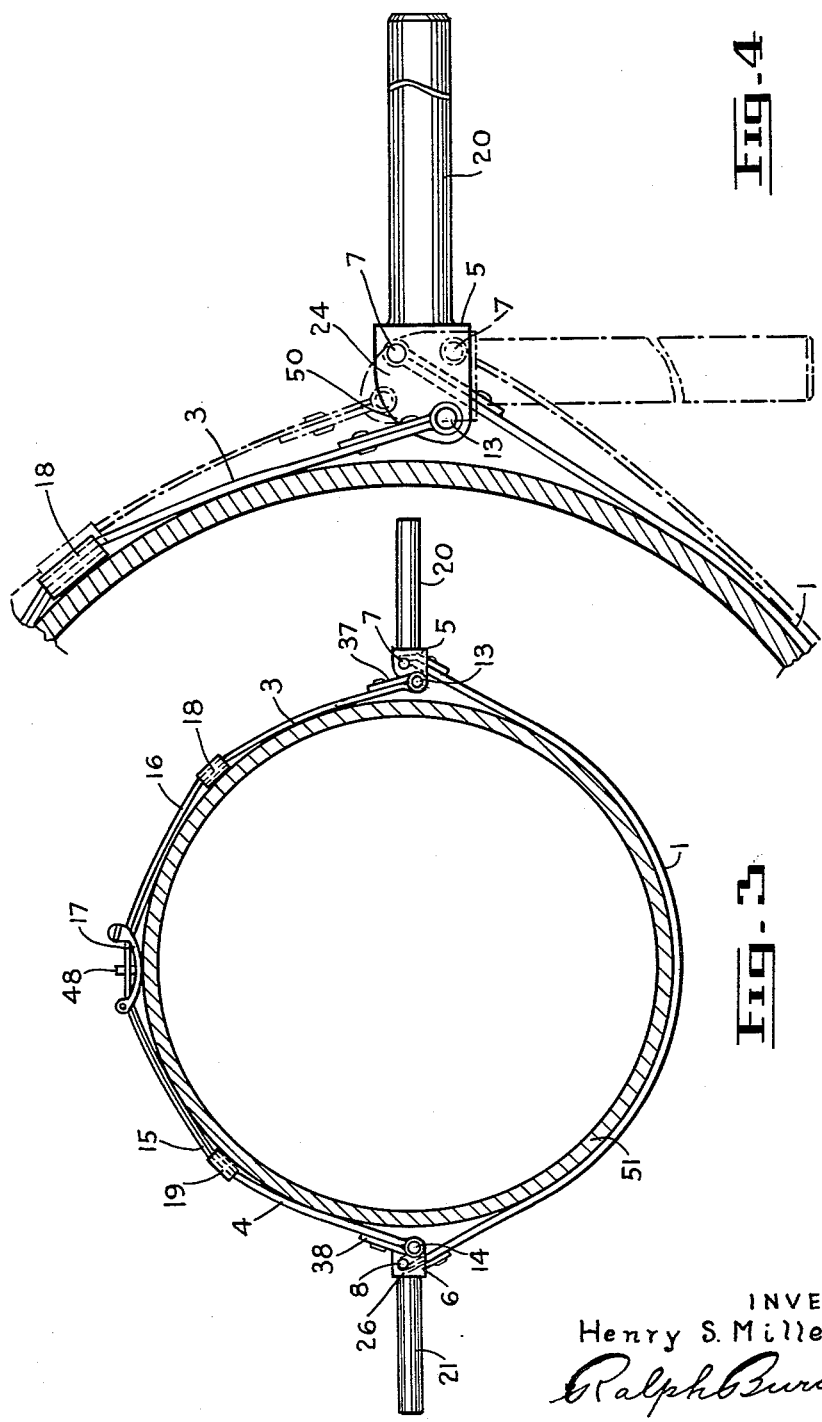
INVENTOR
Henry S. Miller
Ralph Burch
Attorney

3,050,326
Patented Aug. 21, 1962

3,050,326
UTILITY CLAMP
Henry Sigvald Miller, Box 538, Huntsville,
Ontario, Canada
Filed June 2, 1960, Ser. No. 33,557
3 Claims. (Cl. 294—15)

This invention relates to a clamp for transporting tanks or similar articles containing liquids, gases or other material from one place to another.

At the present time it is a hazardous and clumsy job to move these tanks from one place to another in a workshop, garage or other building. Also it is hazardous to move these tanks from or onto trucks. Some people use what is known as a dolly to move the tanks. Others try to pick up the tank manually, or to roll it on the floor or ground.

The main object of this invention is to provide a clamp for transporting a tank or similar device from one place to another that is simple in construction and reliable in operation.

Another object is to provide a clamp that ensures efficient and economical operation.

Another object is to provide a clamp that is adjustable to various sizes of tanks.

Another object is to provide a clamp that is easily carried or stored in a truck or building where the tanks are used.

These objects are accomplished by providing a clamp to be placed around a tank or similar articles which consists of straps that are eccentrically pivoted to two lugs at the ends of the straps. Two straps are so spaced and pivoted to the lugs to encircle about one-half the tank on one side, and a strap formed in two parts which are adjustably connected together by a buckle or other suitable device is also pivoted to the lugs and adapted to encircle about one-half of the other side of the tank. Handles are provided on the outer side of the lugs for carrying the tank when the straps have been tightened around the tank by rotating the handles which causes the eccentrically mounted pivots to draw the straps tightly around the tank.

The invention consists in the novel arrangements, combination and construction of parts hereinafter described and shown in the drawings.

FIGURE 1, is a front view in perspective of the clamp.

FIGURE 2 is a rear view in elevation of part of the clamp.

FIGURE 3, is a plan view of the clamp laced on a tank.

FIGURE 4, is a plan view of one end of the clamp fitted on a tank.

Referring to the drawings, particularly FIGURE 1, the clamp consists of steel straps 1, 2, 3 and 4. Lugs 5 and 6 are provided at the ends of the straps 1, 2, 3 and 4. Pivot pins 7 and 8 are mounted in the lugs 5 and 6. FIGURE 1 shows the strap 2 connected to the upper ends 9 and 10 of the pivot pins 7 and 8 and the strap 1 connected to the lower ends 11 and 12 of the said pivot pins 7 and 8. Pivot pins 13 and 14 are also mounted on the lugs 5 and 6. The strap 3 is connected to the pivot pin 13 and the strap 4 is connected to the pivot pin 14. The free ends 15 and 16 of the straps 3 and 4 are adjustably connected together by a buckle 17 or any other suitable type of fastener. Metal loops 18 and 19 are shown for keeping the free ends 15 and 16 of the straps 3 and 4 in flat position against one another. Handles 20 and 21 are shown integrally connected to the lugs 5 and 6.

Referring to FIGURES 1 and 2 it will be seen that the lugs 5 and 6 are U-shaped in formation. The bottom sides 22 and 23 of the U-shaped lugs 5 and 6 are integrally connected to the handles 20 and 21. The parallel sides 24, 25, 26 and 27 of the U-shaped lugs 5 and 6 have pivot pins 7 and 8 mounted thereon. The pivot pins 7 and 8 project through the sides 24, 25, 26 and 27 of the U-shaped lugs to form extensions 9, 10, 11 and 12. The ends 28, 89, 30 and 31, of the straps 1 and 2 are overlapped and riveted at 32, 33, 24 and 25 to form loops which are fitted over the pivot pin extensions 9, 10, 11 and 12.

The parallel sides 24, 25, 26 and 27 of the U-shaped lugs 5 and 6 have also the other pivot pins 13 and 14 mounted between them. The ends 36 and 37 of the straps 3 and 4 are overlapped and riveted as shown in FIGURES 1, 2 and 3 at 38 and 39 to form loops which are fitted over the pivot pins 13 and 14. Washers 40 and 41 are welded on the ends of the pivot pins 7 and 8 to maintain the straps 1 and 2 in position.

Referring to FIGURE 2 the buckle 17 is shown consisting of two ends 42 and 43 having apertures 44 and 45 through which a cotter pin 46 passes. A transverse member 47 has a pin 48 projecting therefrom for co-operation with the apertures 49 shown clearly in FIGURES 1 and 2.

Referring to FIGURES 3 and 4 it will be seen that the pivot pins 7, 8, 13 and 14 are eccentrically placed in the lugs 5 and 6. The sides 24, 25, 26 and 27 of the lugs are shown with one part arc shaped at 50 to provide a smoother rotation. These figures show the clamp encircling the tank 51. FIGURE 4 shows in dotted lines the clamp in released position.

As an example of the material the clamp may be made from, the handles may be made from ½ inch steel pipe about 6 inches long, the lugs of 1 inch band iron about one-eighth inch thick, the pivot pins of three-eighths inch cold steel, and the strap bands of 1 inch strap steel about one-sixteenth inch thick. Any other material of various sizes may be used as long as it has the required strength.

In operation if it is necessary to move a tank from one place to another, the straps 1, 2, 3 and 4 are placed around the tank with the handles in the position as shown in dotted lines in FIGURE 3. The two straps 3 and 4 are then fastened together with the buckle 17. The handles 20 and 21 are then rotated forwardly as shown in full lines position in FIGURE 4 to tighten the tank 51 within the straps as shown in FIGURE 3. The tank may then be easily transported by the handles.

While the invention has been shown and described with particular reference to specific embodiments it is understood it is not to be limited thereto but is to be broadly construed and limited only by the scope of the claims.

The embodiments of the invention in which an exclusive property or privilege is claimed are defined as follows:

I claim:

1. A lifter for containers comprising a pair of flexible straps extending around one side of the container and a single flexible strap extending around the other side of the container, U-shape lugs disposed between the ends of said pair of straps and straddling the ends of said single strap, pivot pins projecting from the sides of said lugs adjacent one end thereof pivotally connecting the ends of said pair of straps to said lugs, a pivot pin between the sides of said lugs adjacent the other end thereof pivotally connecting the ends of said single strap to said lugs, and handles extending from the closed ends of said lugs for oscillating said lugs to expand and contract said straps.

2. A lifter for containers as described in claim 1 wherein the outer ends of said lugs are provided with cam surfaces for engagement with the side of the container to facilitate oscillation of the lugs.

3. A lifter for containers as described in claim 1 wherein said single strap is formed of sections adjustably connected together.

(References on following page)

References Cited in the file of this patent

UNITED STATES PATENTS

| | | | |
|---|---|---|---|
| 820,126 | Phillips | May 8, | 1906 |
| 877,012 | Sullivan | Jan. 21, | 1908 |
| 1,220,466 | Schultz | Mar. 27, | 1917 |
| 1,496,707 | Gow | June 3, | 1924 |
| 1,598,561 | Coomer | Aug. 31, | 1926 |
| 1,625,255 | Hudgins | Apr. 19, | 1927 |
| 1,889,152 | Phillips | Nov. 29, | 1932 |
| 2,385,913 | Fink | Oct. 2, | 1945 |
| 2,978,154 | Kailey | Apr. 4, | 1961 |